(12) United States Patent
Lim et al.

(10) Patent No.: US 10,116,910 B2
(45) Date of Patent: *Oct. 30, 2018

(54) IMAGING APPARATUS AND METHOD OF PROVIDING IMAGING INFORMATION

(71) Applicant: Hanwha Techwin Co., Ltd., Changwon-si (KR)

(72) Inventors: Jeongeun Lim, Changwon-si (KR); Seungin Noh, Changwon-si (KR); Eunji Choi, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 14 days.

This patent is subject to a terminal disclaimer.

(21) Appl. No.: 15/217,465

(22) Filed: Jul. 22, 2016

(65) Prior Publication Data
US 2016/0330425 A1 Nov. 10, 2016

Related U.S. Application Data

(63) Continuation-in-part of application No. 14/599,083, filed on Jan. 16, 2015, now Pat. No. 9,406,342.

(30) Foreign Application Priority Data

Jul. 18, 2014 (KR) .................. 10-2014-0091316

(51) Int. Cl.
*H04N 9/80* (2006.01)
*H04N 5/77* (2006.01)
(Continued)

(52) U.S. Cl.
CPC ....... *H04N 9/8715* (2013.01); *G06F 3/04847* (2013.01); *G06K 9/00744* (2013.01);
(Continued)

(58) Field of Classification Search
USPC .................................................. 386/223–224
See application file for complete search history.

(56) References Cited

U.S. PATENT DOCUMENTS

| 5,969,755 A | 10/1999 | Courtney |
| 7,982,738 B2 | 7/2011 | Jojic et al. |

(Continued)

FOREIGN PATENT DOCUMENTS

| KR | 10-2007-0055823 A | 5/2007 |
| KR | 10-2011-0121234 A | 11/2011 |
| KR | 10-2012-0105795 A | 9/2012 |

*Primary Examiner* — Hung Dang
(74) *Attorney, Agent, or Firm* — Sughrue Mion, PLLC

(57) ABSTRACT

Provided is an imaging apparatus which includes: a video reproducer reproducing a video and a heatmap of the video on a display in a selective manner between overlapping the video and the heatmap with each other and displaying the video and the heatmap on different areas, respectively; a sub-heatmap area setter setting a plurality of sub-heat map areas on the heatmap; and a video summarizer providing a video summary of the video selectively to a summary area selected from among the sub-heatmap areas or to an area different from the sub-heatmap areas, respectively, wherein the video reproducer also reproduces a portion of the video corresponding on an interest area selected from among the sub-heatmap areas, and the at least one summary area and the at least one interest area are a same area or different areas in the heatmap.

18 Claims, 12 Drawing Sheets

(51) Int. Cl.
*H04N 5/775* (2006.01)
*H04N 9/87* (2006.01)
*G11B 27/10* (2006.01)
*G11B 27/34* (2006.01)
*H04N 5/765* (2006.01)
*H04N 5/91* (2006.01)
*H04N 9/82* (2006.01)
*G06F 3/0484* (2013.01)
*G06K 9/00* (2006.01)

(52) U.S. Cl.
CPC ........ *G06K 9/00771* (2013.01); *G11B 27/102* (2013.01); *G11B 27/105* (2013.01); *G11B 27/34* (2013.01); *H04N 5/765* (2013.01); *H04N 5/775* (2013.01); *H04N 5/91* (2013.01); *H04N 9/8205* (2013.01)

(56) References Cited

U.S. PATENT DOCUMENTS

| | | |
|---|---|---|
| 2006/0120624 A1 | 6/2006 | Jojic et al. |
| 2007/0003224 A1* | 1/2007 | Krikorian ............. G06F 3/0481 386/220 |
| 2007/0124679 A1 | 5/2007 | Jeong et al. |
| 2009/0148124 A1 | 6/2009 | Athsani et al. |
| 2012/0159329 A1 | 6/2012 | Chow et al. |
| 2013/0091432 A1* | 4/2013 | Shet ................ G08B 13/19645 715/719 |
| 2015/0187102 A1 | 7/2015 | Park et al. |
| 2015/0269143 A1 | 9/2015 | Park et al. |

\* cited by examiner

IMAGING APPARATUS AND METHOD OF PROVIDING IMAGING INFORMATION

CROSS-REFERENCE TO THE RELATED APPLICATION

This is a continuation-in-part Application of U.S. application Ser. No. 14/599,083 filed Jan. 16, 2015, which claims priority from Korean Patent Application No. 10-2014-0091316, filed on Jul. 18, 2014, in the Korean Intellectual Property Office, the disclosure of which is incorporated herein in its entirety by reference.

BACKGROUND

1. Field

Apparatuses and methods consistent with exemplary embodiments relate to providing video summaries, and more particularly, to providing video summaries associated with a heatmap.

2. Description of the Related Art

A network image surveillance system is used to monitor streets, buildings, factories, etc. which a user wants to keep under observation for certain purposes such as crime prevention via image capturing devices such as network cameras.

The network image surveillance system may be a network video recorder (NVR) system. The NVR system is an image security system capable of transmitting, storing, and monitoring images of a surveillance target area by using Internet protocols for image surveillance.

The NVR system is configured to flexibly perform image security surveillance via Internet networks and is advantageous in terms of expandability, reduced setting costs, flexible remote monitoring, etc.

SUMMARY

When a user performs a search or video reproduction operation based on image data having a long runtime, the user needs to spend a long time proportional to the runtime. Although a storage device may have a fast forward or fast backward function that the user may employ in order to reduce the search or reproduction time, it is still difficult to search for or reproduce information in large videos.

Exemplary embodiments provide an apparatus and method by which, when a user wants to search for significant amount of data in a video having a long runtime, an image searched for by the user is extracted by using only a video summary function which generates a video summary from the video. Further, a heatmap which shows a frequency of appearance of an object in the video may be provided along with the video summary.

Various aspects of the exemplary embodiments will be set forth in part in the description which follows and, in part, will be apparent from the description, or may be learned by practice of the presented embodiments.

According to an exemplary embodiment, there is provided an imaging apparatus which may include: a video reproducer configured to reproduce a video and a heatmap of the video on a display in a selective manner between overlapping the video and the heatmap with each other and displaying the video and the heatmap on different areas on the display, respectively; a sub-heatmap area setter configured to set a plurality of sub-heat map areas on the heatmap; and a video summarizer configured to provide at least one video summary of the video selectively to at least one summary area selected from among the sub-heatmap areas or to at least one area different from the sub-heatmap areas, respectively, wherein the video reproducer is further configured to reproduce at least one portion of the video on at least one interest area selected from among the sub-heatmap areas, respectively, and wherein the at least one summary area and the at least one interest area are a same area or different areas in the heatmap.

The video reproducer may be further configured to reproduce the at least one portion of the video on at least one sub-heatmap area, among the plurality of sub-hear map areas, which corresponds to the at least one selected interest area, respectively, and provide heatmap data on at least one sub-heatmap area, among the plurality of sub-heat map areas, which does not correspond to the at least one selected interest area.

The video summarizer may be configured to provide a video summary on a sub-heatmap area, among the plurality of sub-heatmap areas, which corresponds to the at least one selected summary area, and the video reproducer may be further configured to provide heatmap data on a sub-heatmap area, among the plurality of sub-hear map areas, which does not correspond to the at least one selected summary area.

According to another exemplary embodiment, there is provided a method of providing imaging information to an imaging apparatus which may include: reproducing a video and a heatmap of the video on a display in a selective manner between overlapping the video and the heatmap with each other and displaying the video and the heatmap on different areas on the display, respectively; setting a plurality of sub-heat map areas on the heatmap; providing at least one video summary of the video selectively to at least one summary area selected from among the sub-heatmap areas or to at least one area different from the sub-heatmap areas, respectively; and reproducing at least one portion of the video on at least one interest area selected from among the sub-heatmap areas, respectively, wherein the at least one summary area and the at least one interest area are a same area or different areas in the heatmap.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
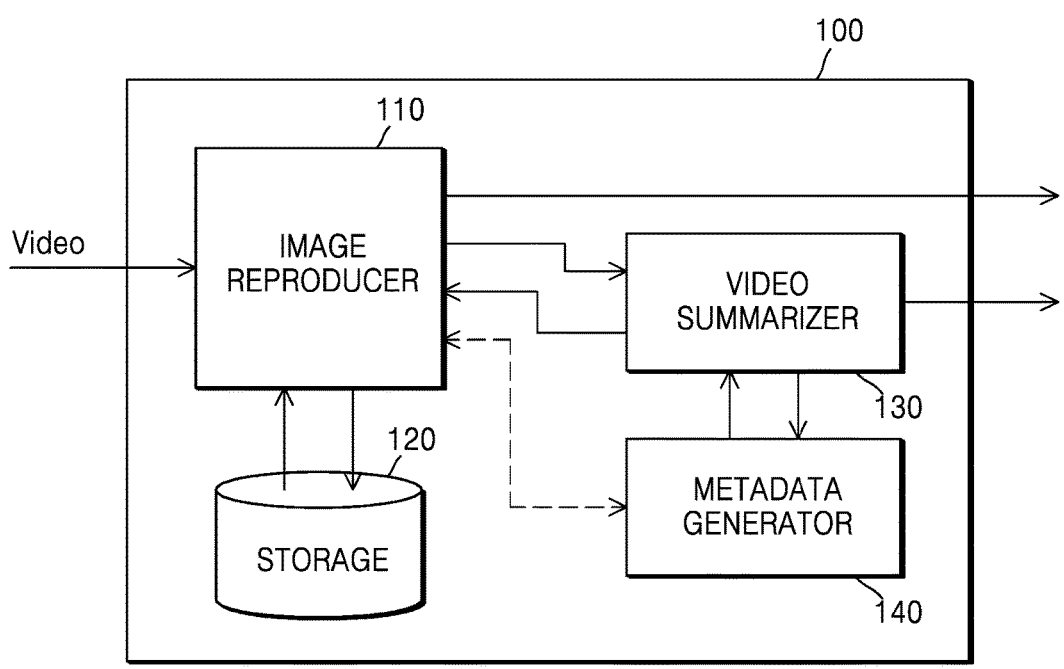
FIG. 1 shows an imaging apparatus for providing video summaries, according to an exemplary embodiment.

As the invention allows for various changes and numerous embodiments, particular embodiments will be illustrated in the drawings and described in detail in the written description. The attached drawings for illustrating preferred embodiments are referred to in order to gain a sufficient understanding, the merits thereof, and the objectives accomplished by the implementation. This invention may, however, be embodied in many different forms and should not be construed as limited to the exemplary embodiments set forth herein.

Hereinafter, the present invention will be described in detail by explaining preferred embodiments of the invention with reference to the attached drawings. Like reference numerals in the drawings denote like elements, and repeated descriptions thereof will be omitted.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including", "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Sizes of components in the drawings may be exaggerated for convenience of explanation. In other words, since sizes and thicknesses of components in the drawings are arbitrarily illustrated for convenience of explanation, the following embodiments are not limited thereto.

FIG. 1 shows an imaging apparatus 100 for providing video summaries, according to an exemplary embodiment.

The imaging apparatus 100 may include or may be a network video recorder (NVR), a digital video recorder (DVR), or the like. According to an exemplary embodiment, the imaging apparatus 100 includes an image reproducer 110, a storage 120, a video summarizer 130, and a metadata generator 140.

According to an exemplary embodiment, the imaging apparatus 100 may receive and store input videos from many different types of video archives recorded on digital video recorders (DVRs), network video recorders (NVRs) or an external image device in a wired or wireless manner. The imaging apparatus 100 reproduces the stored input videos and provides video summaries of the reproduced input videos when the input videos are reproduced according to a user request.

According to an exemplary embodiment, the imaging apparatus 100 may receive videos from network cameras and may display the received videos on a single display screen.

Figure 6:
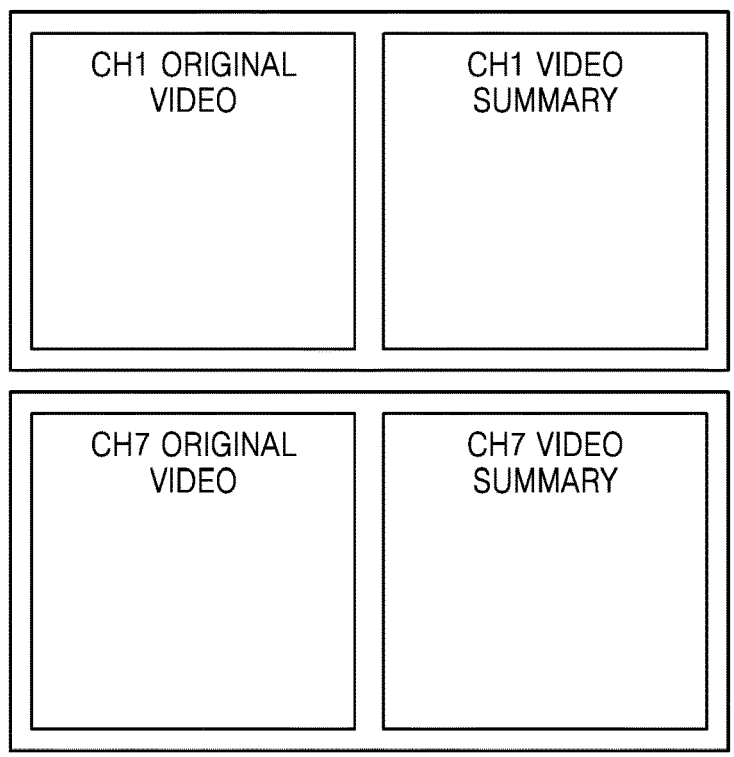
FIG. 6 shows an example of reproducing video summaries in an imaging apparatus, according to an exemplary embodiment.

According to another exemplary embodiment with reference to FIG. 6, when multiple input videos are displayed on a single display screen, the imaging apparatus 100 may display both the input videos and video summaries thereof on the display screen.

Figure 7:
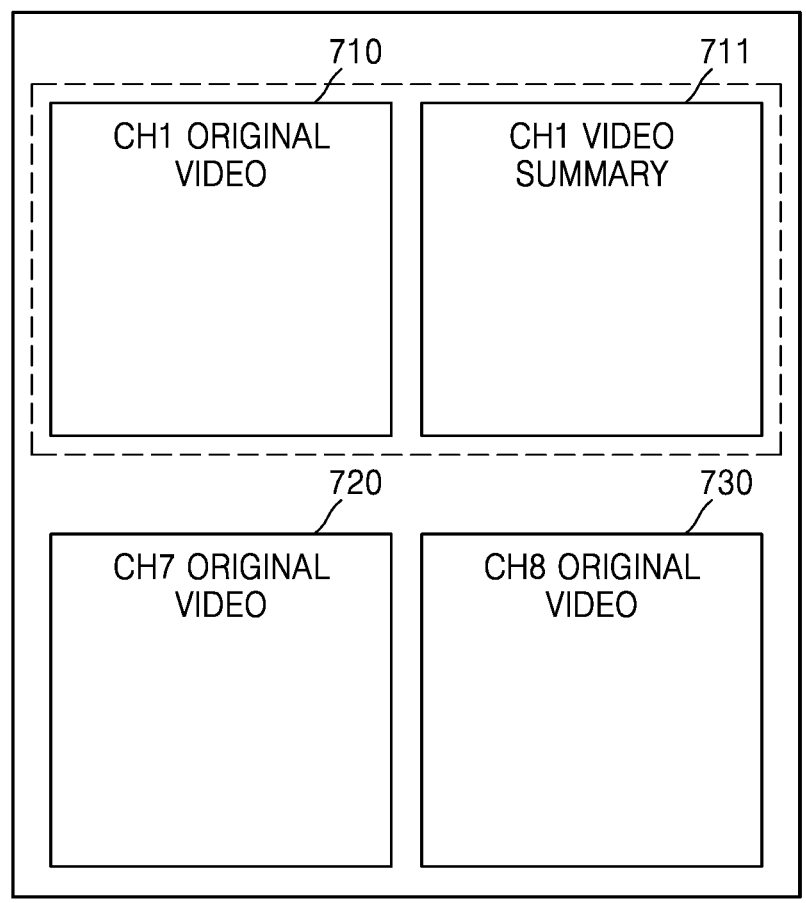
FIG. 7 shows an example in which video summary functions with regard to channels are selectively turned on/off, when videos from the channels are displayed in an imaging apparatus, according to an exemplary embodiment.

According to another exemplary embodiment with reference to FIG. 7, when input videos from multiple channels are displayed on a single display screen, a video summary from a selected channel may be displayed on the display screen together with the input videos including an original video of the video summary based on a user selection.

Figure 8:
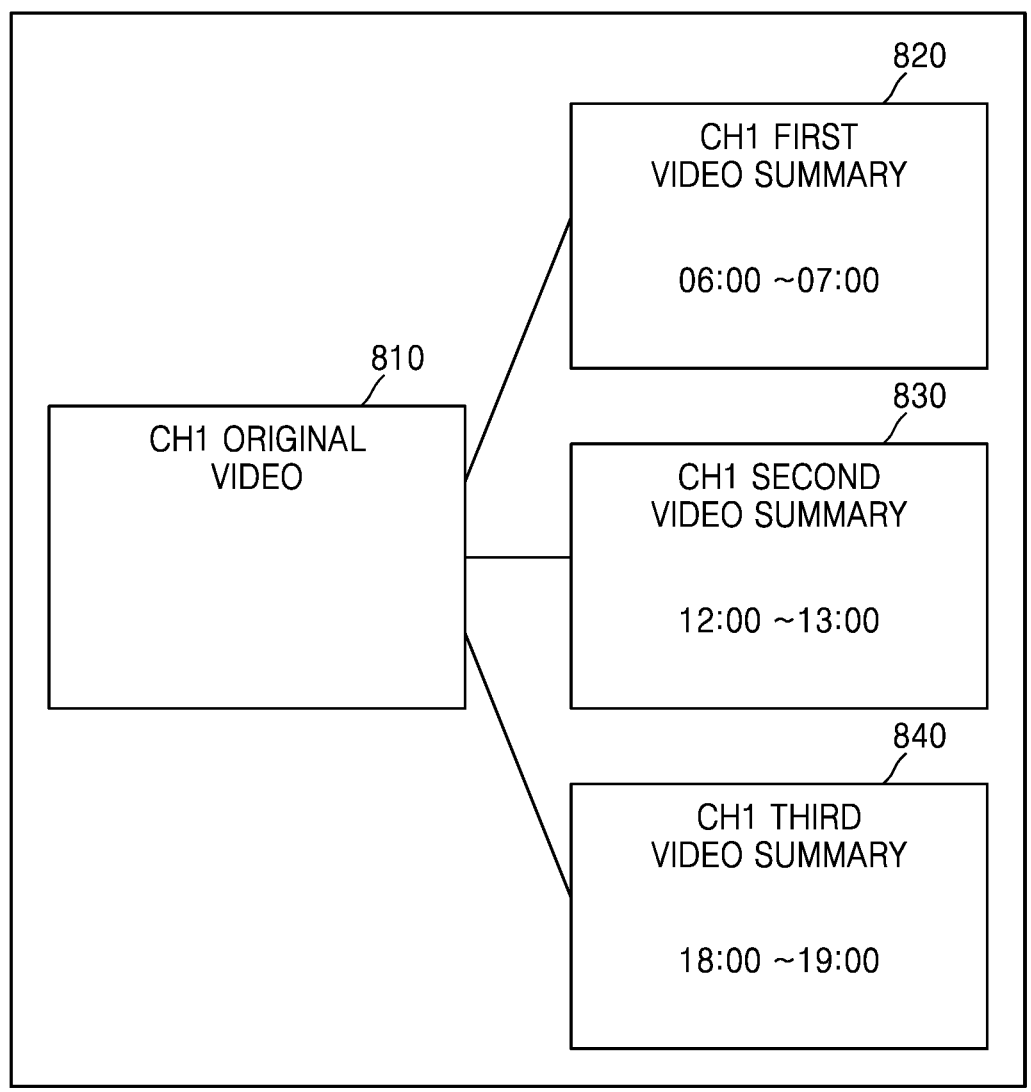
FIG. 8 shows an example of simultaneously reproducing video summaries with regard to a single channel of an imaging apparatus, according to an exemplary embodiment.

According to another exemplary embodiment with reference to FIG. 8, the imaging apparatus 100 may display a single original video and several synopsis video clips or video summaries corresponding to different time sections on a single display screen.

Figure 9:
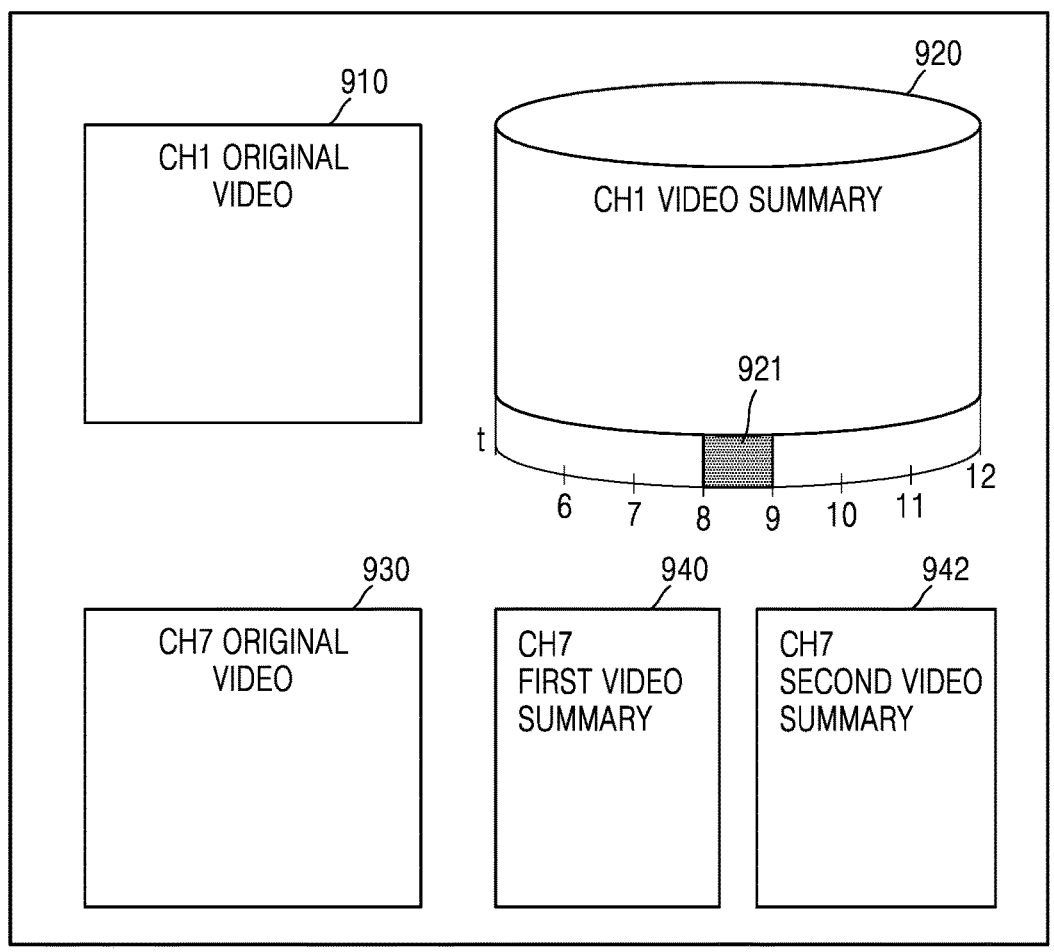
FIG. 9 shows an example of reproducing a desired number of video summaries with regard to each channel of an imaging apparatus, according to an exemplary embodiment.

According to another exemplary embodiment with reference to FIG. 9, the imaging apparatus 100 may display a first video together with a video summary of the first video and a second video together with multiple video summaries of the second video.

Each component of the imaging apparatus 100 for providing video summaries is briefly described as follows with reference to FIG. 1. According to an exemplary embodiment, the image reproducer 110 may include a central processing unit (CPU), and the storage 120 may include a hard disk drive (HDD).

The image reproducer 110 receives original videos that are input and stores the received original videos in the storage 120. Also, while storing the original videos in the storage 120, the image reproducer 110 may reproduce the received original videos on the display screen of the imaging apparatus 100. The image reproducer 110 controls the storage 120, the video summarizer 130, and the metadata generator 140 and reproduces the original videos or video summaries.

The image reproducer 110 may also provide the metadata generator 140 with the original videos that are input. The metadata generator 140 extracts metadata from the original videos in order to perform an intelligent image analysis and stores the extracted metadata in the storage 120 by using the image reproducer 110.

The metadata generator 140 assigns identifiers (IDs) such as identification numbers to objects of the original videos, respectively, in time section units of the original videos, and extracts coordinate information, classification information, and/or movement detection information of the objects to which the IDs are assigned. Here, the classification information is provided for classifying the objects according to types and/or colors thereof.

The objects include feature information about objects such as a person, an animal, a product, etc., and each object may have its feature information. As an example of the feature information, when the product is a vehicle, information about whether the vehicle is a car, a bus, a truck, etc., color information of the vehicle, and vehicle number information if the vehicle has a license plate are included in the feature information and/or object information.

The video summarizer 130 generates a video summary script regarding each original video by using the metadata generated by the metadata generator 140, and then generates at least one video summary of an original video based on the generated video summary script. Detailed descriptions regarding this will be provided with reference to FIGS. 2 to 4.

A video summary is technology to convert a long archived video into a short video summary, and is used to track or analyze moving objects so as to form a database of the moving objects and actions thereof and simultaneously display on the display screen multiple objects appearing at different time points in the original video.

According to another exemplary embodiment, when a video summary function is off, the image reproducer 110 receives a video, stores the received video in the storage 120, and then transmits an original video to the metadata generator 140. The metadata generator 140 generates metadata with regard to the original video and stores the generated metadata in the storage 120 according to control of the image reproducer 110. The image reproducer 110 may store the generated metadata in the storage 120 in real time.

According to another exemplary embodiment, when the video summary function is on, the image reproducer 110 receives a user input with regard to a time section (for example, between 07:00 and 07:30) during which the user wants to watch a video summary. Then, the image reproducer 110 outputs original video which corresponds to the time section input by the user, and the video summarizer 130 receives metadata corresponding to the same time section from the metadata generator 140, and generates a video summary based on the received metadata. Then, the imaging apparatus 100 displays the generated video summary together with the original video output from the image reproducer 110.

Figure 2:
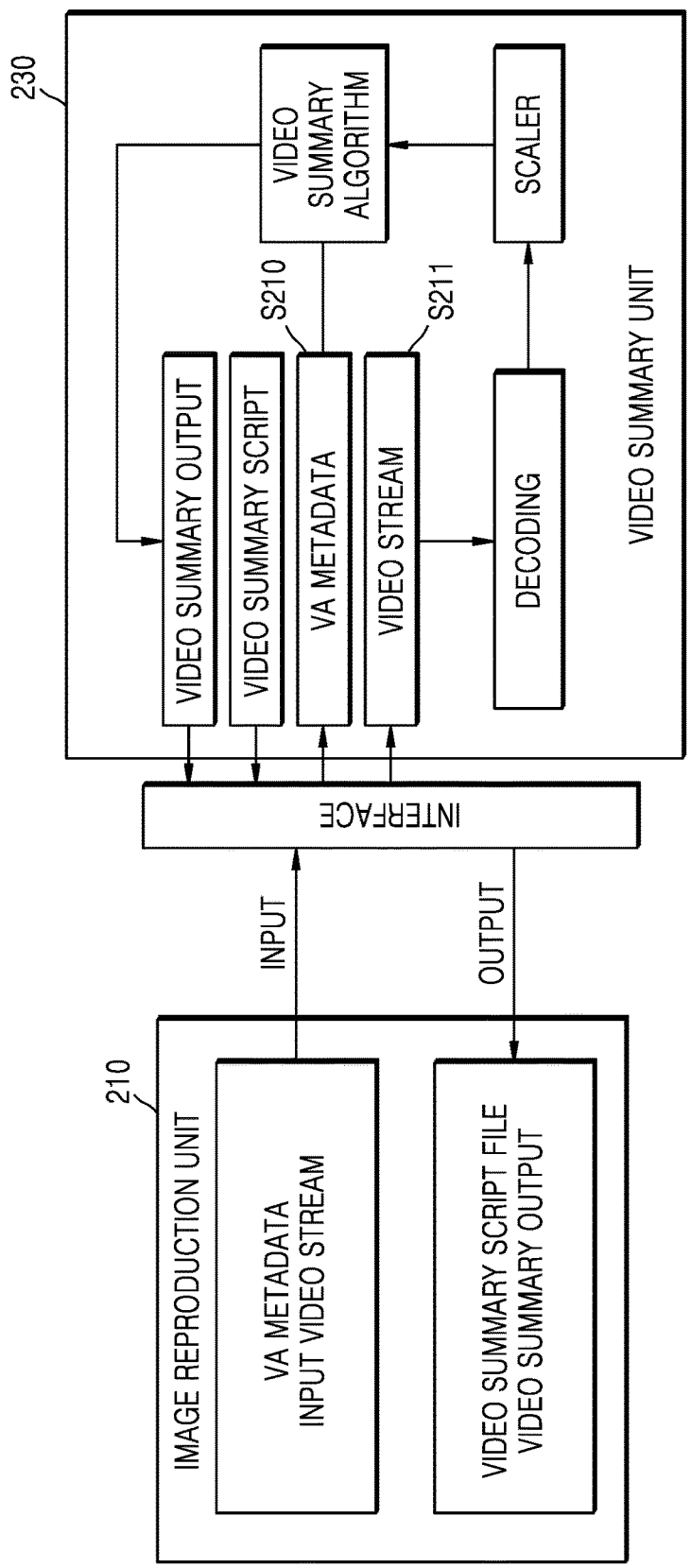
FIG. 2 shows a structure of a video summarizer, according to an exemplary embodiment.

FIG. 2 shows a structure of a video summarizer 230, according to an exemplary embodiment. The video summarizer 230 may correspond to or be the same as the video summarizer illustrated in FIG. 1.

The video summarizer 230 decodes a receive video (S211) by using metadata (S210) generated by the metadata generator 140 of FIG. 1 so as to generate an original video, re-samples frames of the original video, and then generates at least one video summary through a process of scaling the original video to be in a range that may be processed by the video summarizer 230.

The video summarizer 230 generates a video script with regard to the original video and transmits the video script to an image reproducer 210. Here, the video reproducer may correspond to or be the same as the video reproducer 110 illustrated in FIG. 1. The image reproducer 210 analyzes the received video script and transmits video sections S310, S320 and S330 of FIG. 3, which are necessary for the video summarizer 230 to generate at least one video summary, to the video summarizer 230. At least one video summary with regard to the video sections S310, S320 and S330 of FIG. 3 is generated in the video summarizer 230.

Figure 3:
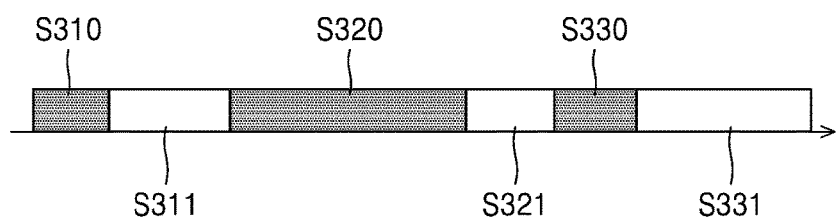
FIG. 3 shows an example of video sections to be used in the video summary unit, according to an exemplary embodiment.

FIG. 3 shows an example of video sections used in the video summarizer 130 of FIG. 1, according to an exemplary embodiment.

The video summarizer 130 generates a compressed image frame by extracting image frames and time information from the original video by using the metadata generated by the metadata generator 140 of FIG. 1.

The video summary script is used to extract background information from the image frames by using the metadata generated by the metadata generator 140 of FIG. 1, and detect significant movements by using an advanced motion detection (AMD) method. Then, object information and/or feature information about objects are extracted from the significant movements. The video summary script includes information regarding an order and/or locations of objects to be displayed in at least one video summary in a time order. The objects may be displayed in the video summary in a time order. The video summary script may also include time information with regard to at least one video section of the original video used to generate the video summary.

A significant movement denotes movements of a person, a vehicle, or a certain object from among various movements. Alternatively, the significant movement may denote a movement of a certain object in a certain area. Therefore, a movement such as a movement of leaves in the wind, or a movement of clouds is not considered as a significant movement.

According to an exemplary embodiment, the image reproducer 110 of FIG. 1 only transmits significant video sections S310, S320 and S330 of FIG. 3 to the video summarizer 130 of FIG. 1 by using the video summary script. In this case, the significant video sections S310, S320 and S330 of FIG. 3 may be sections including significant movements or information about at least one of an object area and a color area.

Figure 4:
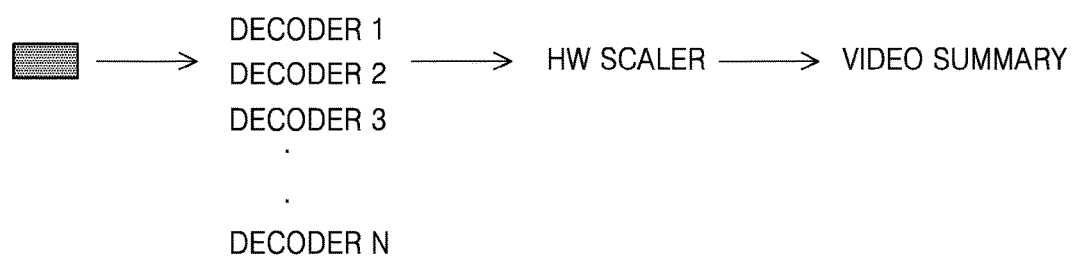
FIG. 4 shows an example of a decoding operation for generating video summaries in a video summarizer, according to an exemplary embodiment.

FIG. 4 shows an example of a decoding operation for generating at least one video summary in the video summarizer 130 of FIG. 1, according to an exemplary embodiment.

The image reproducer 110 of FIG. 1 transmits only the significant video sections S310, S320 and S330 of FIG. 3 to the video summarizer 130 by using the video script. In this case, each of the significant video sections S310, S320 and S330 of FIG. 3 may be decoded in different decoders.

The video summarizer 130 of FIG. 1 generates at least one video summary in frame units by extracting information about a movement area, an object area, a color, and a predetermined event from each of the significant video sections S310, S320 and S330 of FIG. 3 which are decoded in a multi-decoder, and then transmits the generated video summary to the image reproducer 110 of FIG. 1. The image reproducer 110 controls the video summary, which is generated in frame units to be stored in the storage 120 of FIG. 1 and/or simultaneously reproduced together with the original video.

Figure 5:
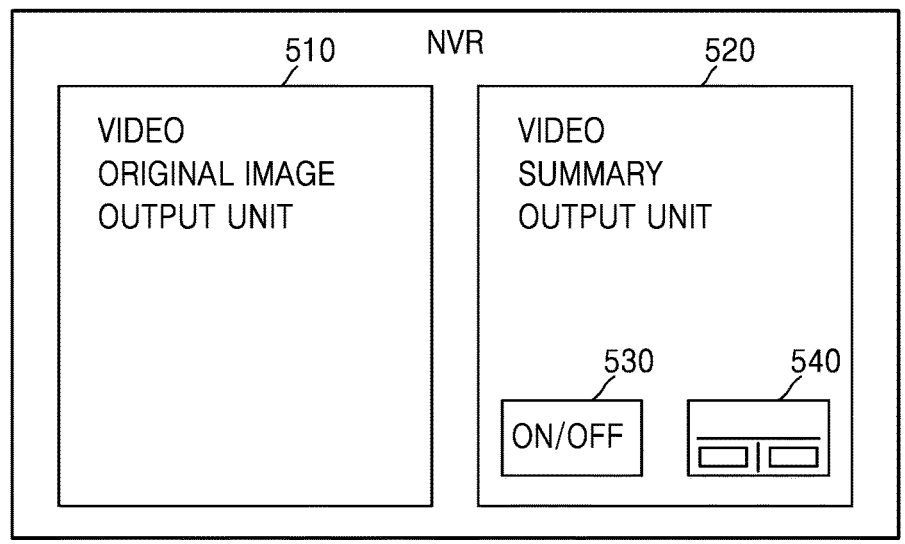
FIG. 5 shows an example of reproducing a video summary in an imaging apparatus, according to an exemplary embodiment.

FIG. 5 shows an example of reproducing a video summary in an imaging apparatus, according to an exemplary embodiment. According to an exemplary embodiment, an imaging apparatus 100 shown in FIG. 5 may be an NVR.

The imaging apparatus includes a video original image outputter 510 and a video summary outputter 520. A display of the imaging apparatus 100 is divided and may output both original videos and video summaries thereof.

The imaging apparatus has a first interface 530 and a second interface 540.

The first interface 530 allows a user to select whether to turn on or off a video summary function. When the first interface 530 is turned on, the second interface 540 allows the user to designate a video summary of a certain time section. The user may select multiple time sections by using the second interface 540.

When the video summary function is turned on via the first interface 530, the second interface 540 allows the user to automatically select a certain time section.

FIG. 6 shows an example of reproducing video summaries in an imaging apparatus, according to an exemplary embodiment.

The imaging apparatus may reproduce multiple videos from multiple channels. In this case, the imaging apparatus displays a video from a channel selected by a user on a display screen by dividing the display screen, and when the user turns on the video summary function, displays a video summary of the channel. When videos from multiple channels are displayed, a determination as to whether a video summary with regard to each channel is displayed may be made.

FIG. 7 shows an example in which video summary functions with regard to channels are selectively turned on/off when videos input through the channels are displayed in the imaging apparatus, according to an exemplary embodiment.

As shown in FIG. 6, while the user watches the original videos and video summaries of first and seventh channels, the user may turn off the video summary function of the channel 7. Then, the imaging apparatus may additionally display an original video of an eighth channel.

Also, the imaging apparatus may display the original videos of the first, seventh and eighth channels 710, 720 and 730, and by turning on the video summary function of the first channel 710 from among the first, seventh and eighth channels 710, 720 and 730, the video summary of the first channel 710 may be displayed (711).

FIG. 8 shows an example of simultaneously reproducing video summaries with regard to a single channel of an imaging apparatus, according to an exemplary embodiment.

The user selects a certain channel and may watch an original video and video summaries of certain time sections of the selected channel. For example, the user may watch video summaries of office hours 820, lunch time 830, and office leaving period 830 in a first channel 810 receiving an input video from a network surveillance camera that monitors entrances and exits of an office.

FIG. 9 shows an example of reproducing a desired number of video summaries with regard to multiple channels of an imaging apparatus, according to an exemplary embodiment.

The imaging apparatus may reproduce original videos of first and seventh channels 910 and 930. The user may turn on video summary functions of the first and seventh channels 910 and 930 by using a first interface, and then the imaging apparatus may reproduce the video summaries of the first and seventh channels 910 and 930.

In this case, the imaging apparatus reproduces a video summary 920 of a time section 921 in a range from eight o'clock to nine o'clock with regard to the first channel 910, and may reproduce two video summaries 940 and 942 with regard to the seventh channel 930. Also, the user may intuitively select desired time sections by using a second interface 921.

Figure 10:
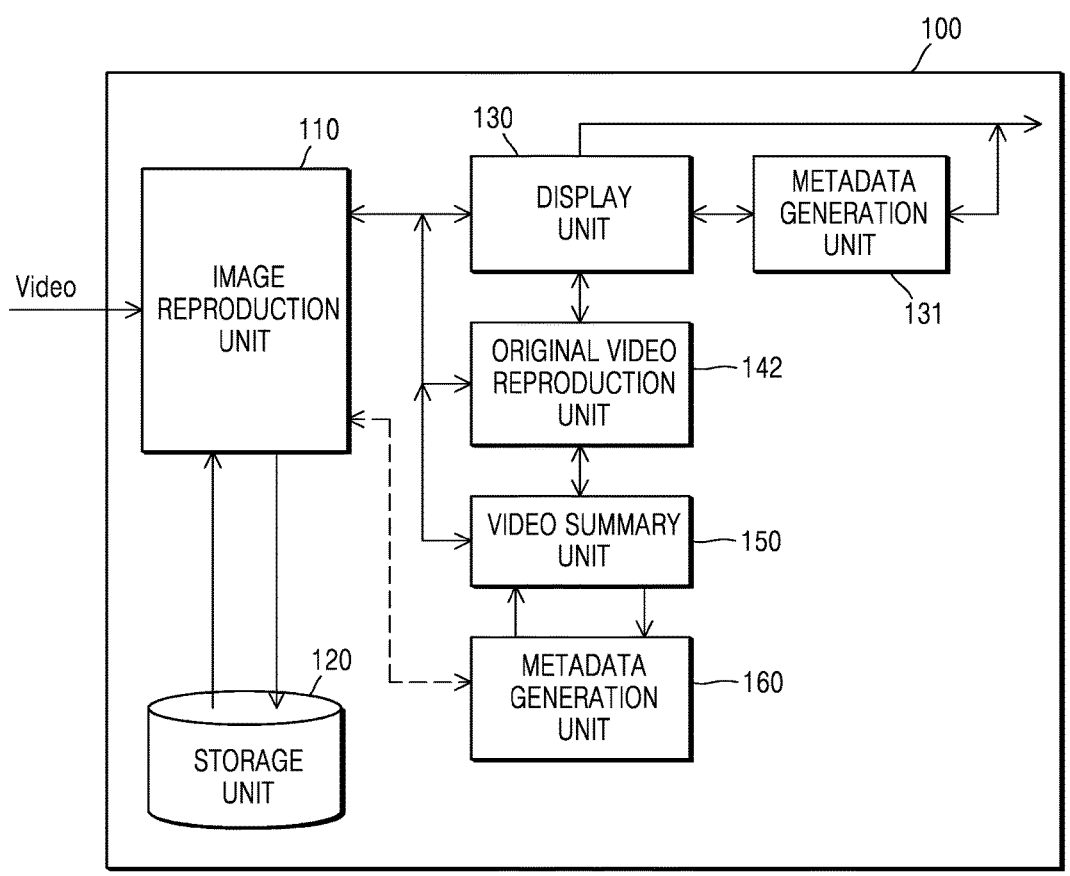
FIG. 10 shows an internal structure of the imaging apparatus for providing a heatmap including statistical data and video summaries, according to an exemplary embodiment.

FIG. 10 shows an internal structure of the imaging apparatus 100 for providing a heatmap including statistical data and video summaries, according to an exemplary embodiment.

The imaging apparatus 100 includes the image reproducer 110, the storage 120, the video summarizer 130, the metadata generator 140, the display 150, an original video reproducer 160, and a sub-heatmap area setter 151. According to an exemplary embodiment, at least one of the above components constituting the imaging apparatus 100 may be implemented in an apparatus connected to the imaging apparatus 100. According to another exemplary embodiment, two or more components of the imaging apparatus 100 may be implemented as one single component in the imaging apparatus 100. According to still another exemplary embodiment, a portion of functions performed by one element of the imaging apparatus 100 may be performed by another element included in the imaging apparatus 100.

Descriptions of the image reproducer 110, the storage 120, the video summarizer 130, and the metadata generator 140 have been provided with reference to FIG. 1.

Figure 11:
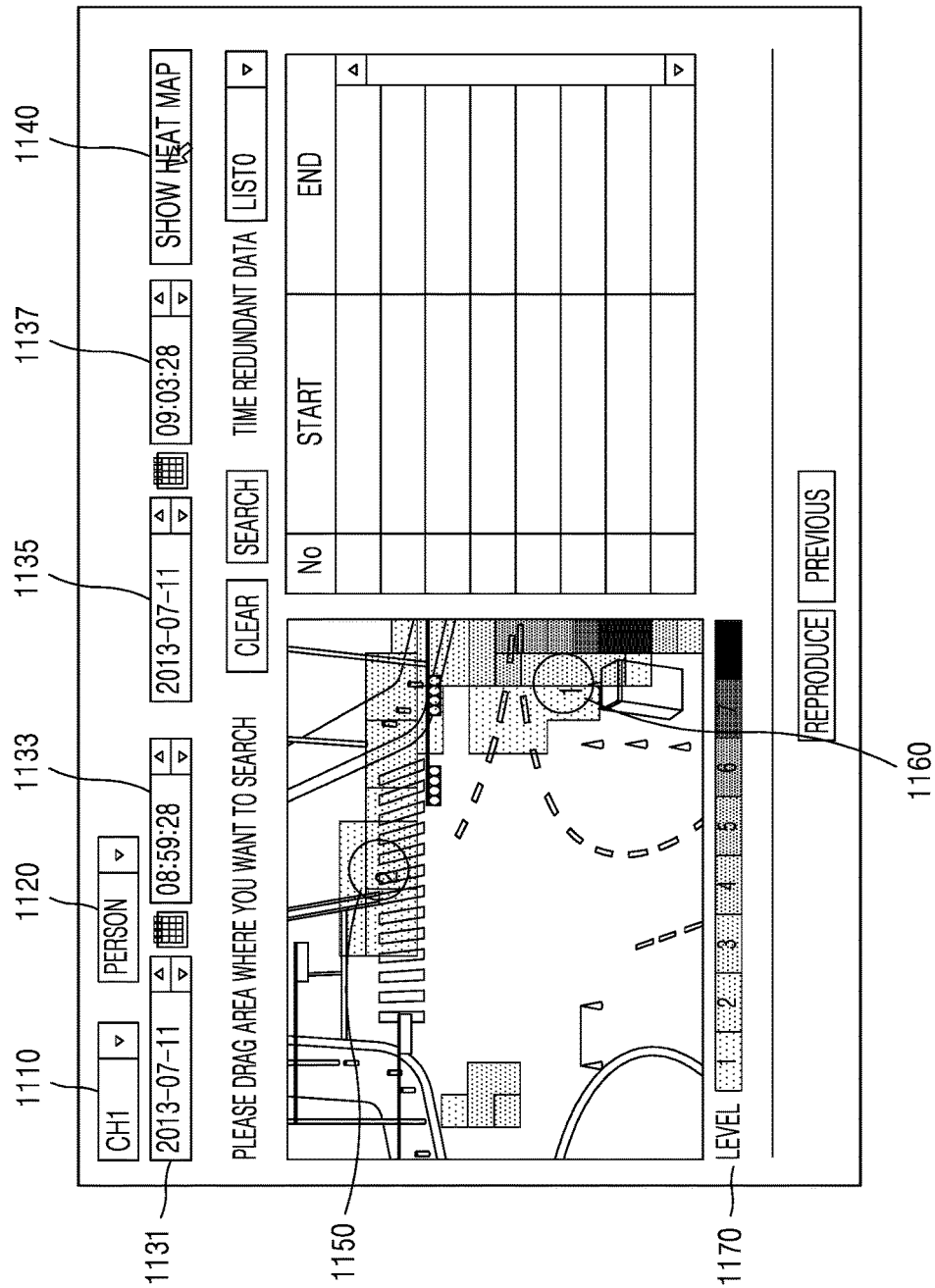
FIG. 11 shows a heatmap including statistics based on an appearance frequency of a person in an input video of a first channel, according to an exemplary embodiment.

The display 150 displays a video and a heatmap by overlapping at least one layer on the video. Referring to FIG. 11, the display 150 displays the input video and the heatmap (or hot zone) including statistical information with regard to the input video. The heatmap and heatmap data to be explained later may be generated by the image reproducer 110 or a separate heatmap generator (not shown) which may be additionally included in the imaging apparatus 100.

In the present exemplary embodiment, the heatmap with regard to the input video, which is stored in the image reproducer 110, is generated and stored in advance, and according to a user request, the heatmap may be displayed on the display 150.

Referring to FIG. 11, the heatmap includes statistical data with regard to a certain event. The statistical data includes at least one of object classification data, color classification data, movement detection data, object data, event data, and the like. The statistical data provided by the heatmap may be based on intelligent video analysis option 1120 provided by the imaging apparatus 100.

FIG. 11 shows a heatmap that calculates statistics based on an appearance frequency of "a person" in an input video 1110 of a first channel.

According to an exemplary embodiment, a user may select a desired time and the intelligent video analysis option 1120. In this case, examples of the intelligent video analysis option 1120 are movement detection, object detection, color classification, object classification, event detection, and the like. Examples of an event are a fire occurrence, etc.

The user designates time sections by using interfaces 1131, 1133, 1135 and 1137 which allow the user to select a certain date or certain time sections. Also, the user may check statistics of the heatmap during the time sections selected by the user by using an interface 1140 for selecting a heatmap.

According to an exemplary embodiment, the display 150 displays both the input video 1110 of the first channel and the heatmap including statistical data regarding the appearance frequency of "a person".

According to an exemplary embodiment, the heatmap may be displayed by overlapping at least one layer on the input video 1110. Referring to FIG. 11, each of a first level through an eighth level 1170 indicates the appearance frequency of a person. The appearance frequency of a person is higher when the level increases.

Referring to FIG. 11, the appearance frequency of a person is low in a second area 1150 in a range from 8:59:28 to 9:03:28 on Jul. 11, 2013, and is high in a first area 1160.

The sub-heatmap area setter 1131 has an interface for setting at least one sub-heatmap area of the heatmap displayed on the display 150. The user may set certain areas as sub-heatmap areas on the heatmap by directly touching the display 150 or by using a stylus pen or an external input device such as a mouse. The display 150 may include a touch screen.

Figure 12:
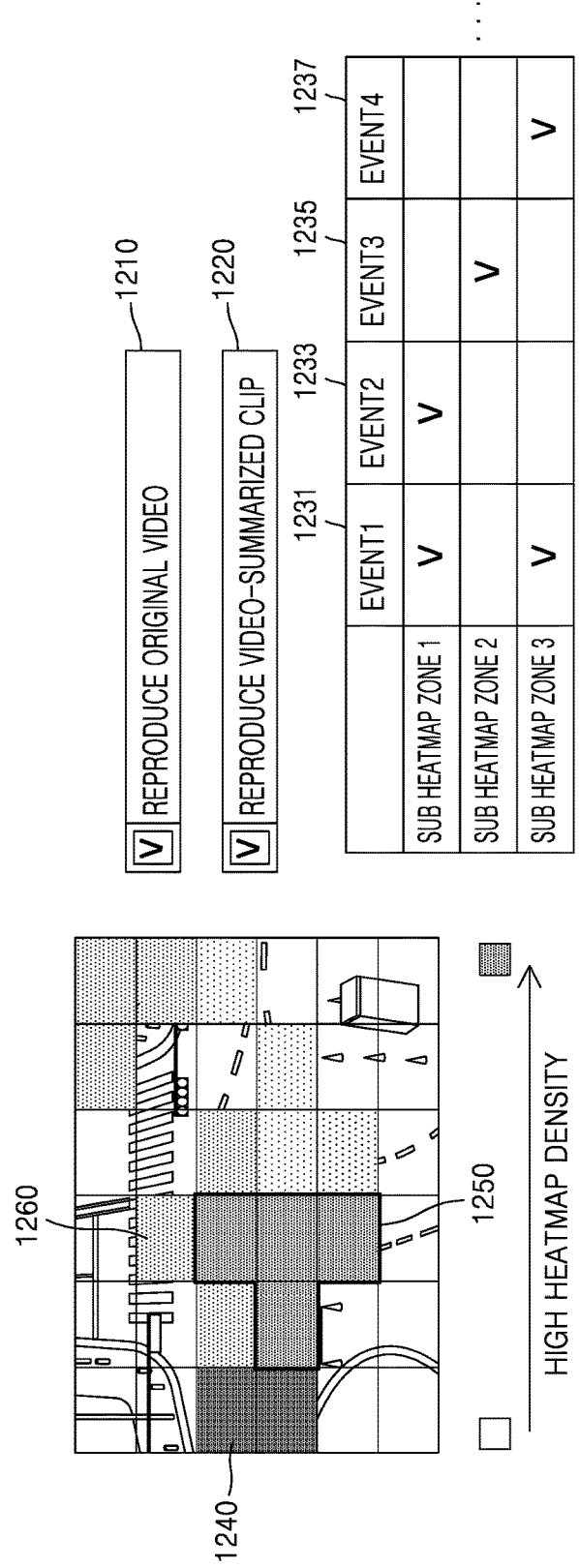
FIG. 12 shows an example in which imaging information is provided in an imaging apparatus, according to an exemplary embodiment.

FIG. 12 shows an example in which imaging information is provide in an imaging apparatus, according to an exemplary embodiment.

In this case, a user may set sub-heatmap areas 1240, 1250 and 1260 of FIG. 12 from among a first sub-heatmap zone, a second sub-heatmap zone, . . . , an $n^{th}$ sub-heatmap zone.

The user may select and reproduce an original video or a video summary with regard to the selected sub-heatmap areas.

According to an exemplary embodiment, when the user wants to watch the original video with regard to the selected sub-heatmap areas, the user may select an original video reproduction interface 1210. In this case, an original video is reproduced on the sub-heatmap areas 1240, 1250 and 1260 selected on a display.

The user may watch the original video on some of the selected sub-heatmap areas. Referring to FIG. 12, the user may watch the original video on two sub-heatmap areas 1240 and 1250 among the selected sub-heatmap areas 1240, 1250 and 1260. The selected sub-heatmap areas 1240 and 1250 are referred to as interest areas. The interest areas may be the same as or different from the sub-heatmap areas. On the sub-heatmap area 1260 beside the interest areas, heatmap data is displayed.

According to another exemplary embodiment, when the user wants to watch video summaries with regard to the selected sub-heatmap areas 1240, 1250 and 1260 of FIG. 12, the user may select a video summary interface 1220 with regard to the selected sub-heatmap areas 1240, 1250 and 1260. In this case, the video summaries are provided to the sub-heatmap areas selected on the display.

Different analysis options may be respectively set in the sub-heatmap areas. For example, a request for a video summary to only analyze a movement detection event and a color classification event may be provided to the first sub-heatmap area 1240.

For example, the first sub-heatmap area 1240 may be set to detect an event in which a white vehicle is moved.

In addition, a request for a video summary may be provided to the second sub-heatmap area 1250 by only detecting an object detection event. For example, a request for a video summary to detect and analyze a person may be provided to the second sub-heatmap area 1250.

Likewise, an event that the user wants to detect may be set in the third sub-heatmap area 1260.

According to another exemplary embodiment, the user may send a request for reproducing the original video on the first sub-heatmap area 1240, a request for providing a video summary on the second sub-heatmap area 1250, and a request for displaying heatmap data on the third sub-heatmap area 1260. The second sub-heatmap area 1250 on which the request for providing the video summary is sent is referred to as a summary area. The summary area may be the same as or different from the sub-heatmap areas. That is, certain areas may be additionally set in the second sub-heatmap area 1250.

According to another exemplary embodiment, the user may send requests for reproducing the original video and for providing the video summaries to the first to third sub-heatmap areas 1240, 1250, and 1260 of FIG. 12.

In particular, the user may send the requests for reproducing the original video and for providing the video summary to the first sub-heatmap area 1240. In this case, the original video is reproduced in an area of the display which corresponds to the first sub-heatmap area 1240, and the video summary may be provided on a neighboring area or another layer.

The heatmap data and the video summary may be displayed on the second sub-heatmap area 1250. Alternatively, the heatmap data is displayed on the second sub-heatmap area 1250, and the video summary is displayed on a neighboring area of the second sub-heatmap area 1250.

When the video summary and the heatmap data overlap each other, the second sub-heatmap area 1250 may be a three-dimensional (3D) polyhedron, and the video summary and the heatmap data may be displayed on each facet of the polyhedron forming the second sub-heatmap area 1250.

Also, when the video summary and the heatmap data overlap each other, layers may overlap each other and be terraced on the second sub-heatmap area 1250, and when the user selects a certain layer, the selected layer becomes a topmost layer and is highlighted when displayed.

For example, when two layers overlap, the video summary is displayed on a first layer and the heatmap data is displayed on a second layer.

Even in a case where the first layer overlaps the second layer and the user selects the second layer, the second layer becomes a topmost layer on the display and is highlighted when displayed. The original video is reproduced on the third sub-heatmap area 1260, and the video summary and the heatmap data may overlap when displayed. In this case, when the video summary and the heatmap data overlap, the third sub-heatmap area 1260 may be a 3D polyhedron, and the original video, the video summary, and the heatmap data may be displayed on each facet of the 3D polyhedron forming the third sub-heatmap area 1260.

When the video summary and the heatmap data overlap, layers may be terraced on the third sub-heatmap area 1260. When the user selects a certain layer, the selected layer becomes a topmost layer and is highlighted when displayed.

As described above, according to the above exemplary embodiments, an imaging apparatus for providing video summaries extracts a certain event detected via various intelligent image surveillance systems or quickly provides a desired result when a certain object needs to be extracted from a video, wherein the intelligent surveillance systems may be used to detect moving objects in or around facilities such as airports, military units, ports, bridges, buildings, stadiums, parking lots, casinos, or in transportation areas such as bus and subway stops, on vehicles, in the vicinity of mobile devices, etc.

Also, the imaging apparatus identifies statistical data by using a heatmap that provides statistical data, and quickly analyzes video summaries or original videos with regard to a certain area based on the statistical data.

According to an exemplary embodiment, there is provided a method of generating and providing the above-described video summary, heatmap, heatmap data along with an original video. Detailed operations or steps of the method are omitted due to redundancy of descriptions.

Figure 13:
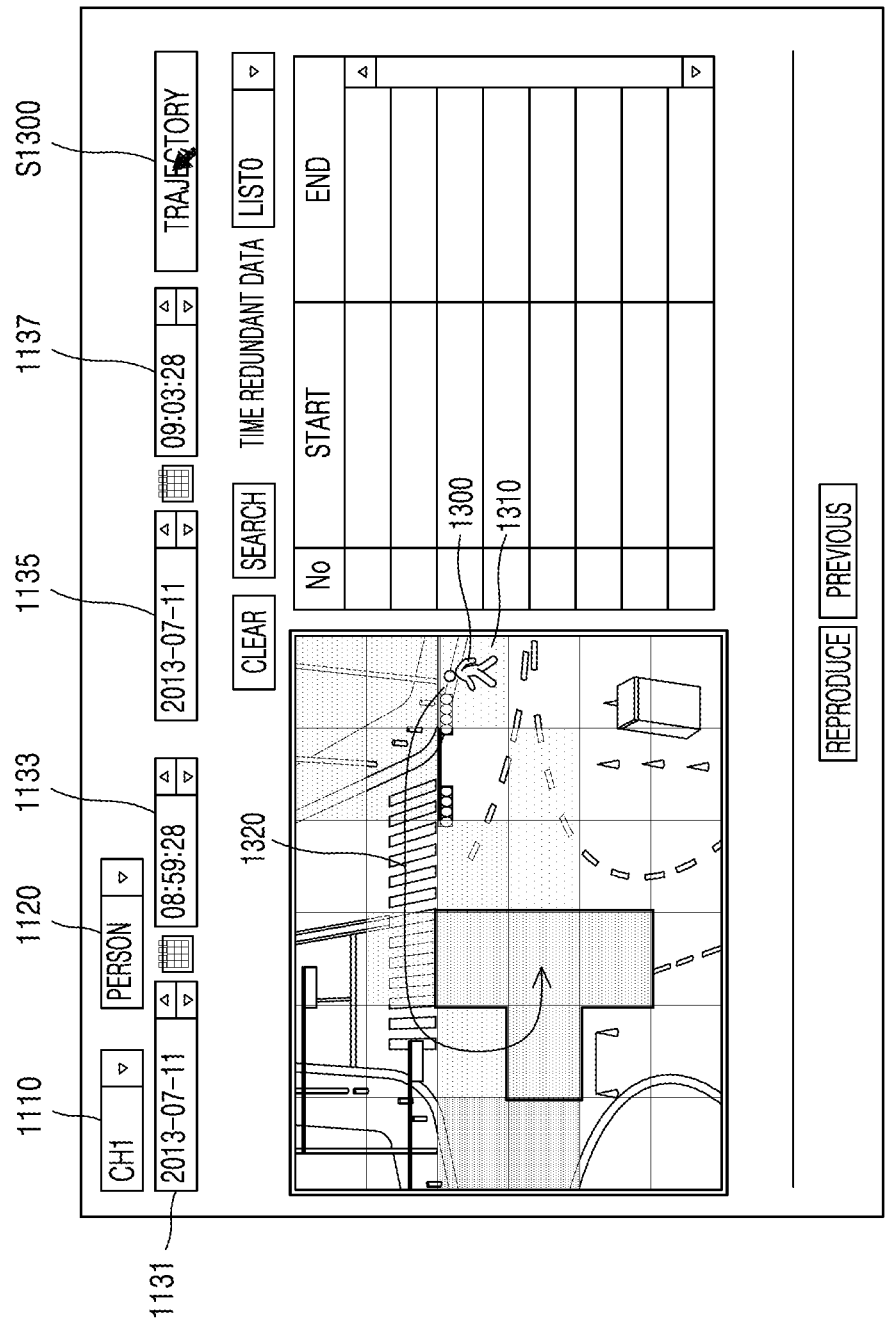
FIG. 13 shows an example of detecting a movement path of an object from an entire heatmap and generating a video summary when the object is detected from a sub-heatmap, according to an exemplary embodiment.

FIG. 13 shows an example of displaying a movement path of the object on an entire screen 1330 of the imaging apparatus which displays an image provided by a CH1 camera and providing a video summary according to a user selection when the object is detected from a sub-heatmap, according to an exemplary embodiment. Referring to FIG. 12, when a certain event occurs in the sub-heatmap, video summaries regarding the sub-heatmap are provided, or the original video is reproduced. Referring to FIG. 13, when a certain event, for example, detection of a person, occurs, in the sub-heatmap as in the exemplary embodiment of FIG. 12, a video summary regarding the event or an original video is provided.

In an exemplary embodiment, when an object 1300 is detected from a sub-heatmap area 1310, if the user or administrator clicks on the entire screen 1330 or selects a "path" by using an interface S1300, a "path" 1320 of the object 1300 detected from the sub-heatmap area 1310 may be displayed on the entire screen 1330.

In an exemplary embodiment similar to the exemplary embodiment of FIG. 12, the user may additionally generate a video summary during a certain time section with regard to the movement path 1320 of the detected object 1300. In this case, unlike the exemplary embodiment of FIG. 12, a video summary regarding the object 1300 detected on the entire screen 1330 is generated.

In an exemplary embodiment similar to the exemplary embodiment of FIG. 12, the user may additionally reproduce a certain time section of an original video regarding the detected object 1300. In this case, unlike the exemplary embodiment of FIG. 12, an original video regarding the object 1300 detected on the entire screen 1330 may be reproduced.

Figure 14:
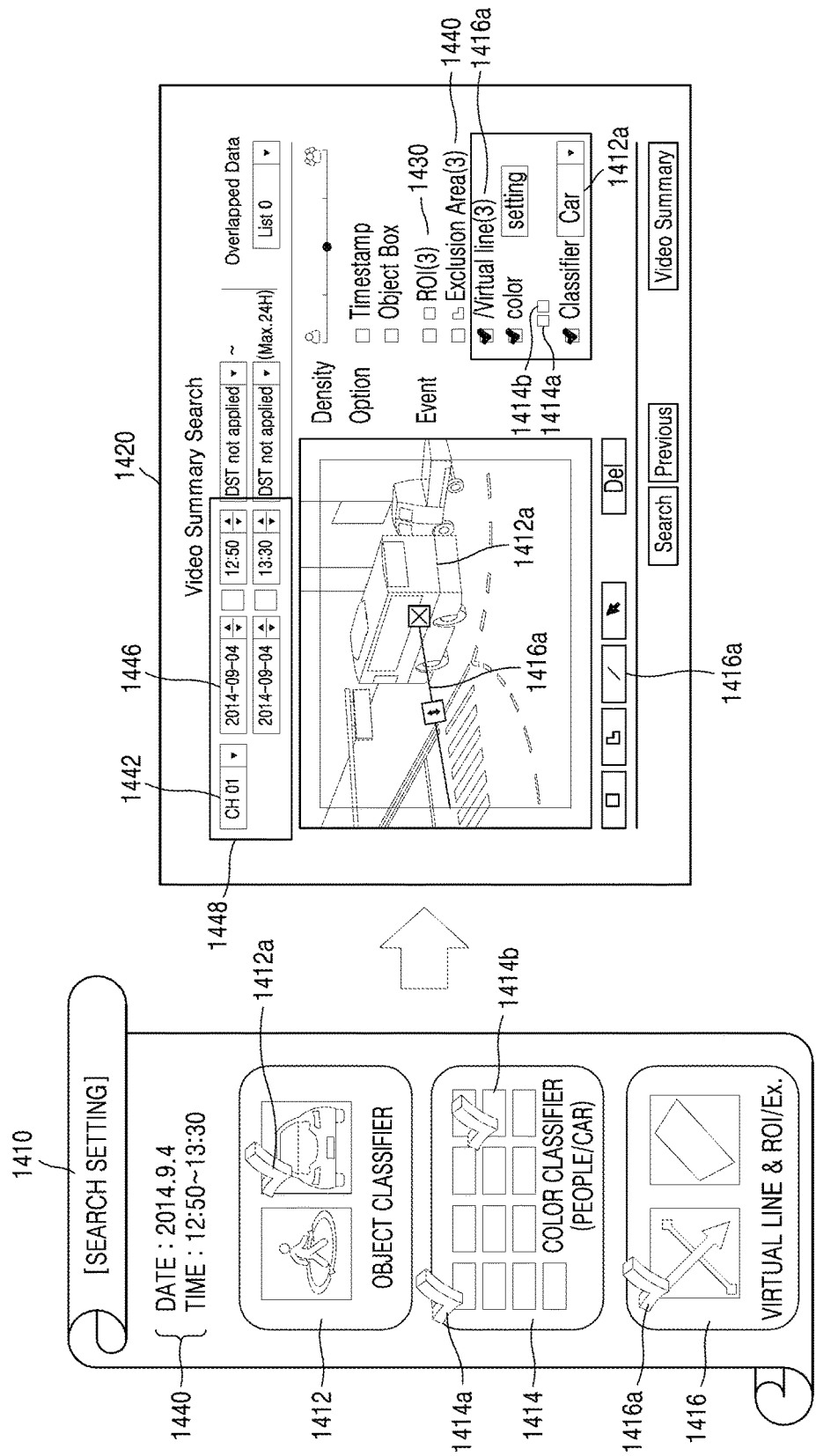
FIG. 14 shows an example of applying a search setting regarding a video summary, according to an exemplary embodiment.

FIG. 14 shows an example of applying a search setting regarding the video summary, according to an exemplary embodiment.

In an exemplary embodiment, the imaging apparatus may set a search of the video summary. The imaging apparatus provides a video summary search setting interface 1410. By using the video summary search setting interface 1410, the imaging apparatus may set a date and time 1440 on which the search of the video summary is based.

The video summary search setting interface 1410 may support an object classification interface 1412 for classifying a certain object. By using the object classification interface 1412, a certain object, for example, a person or a vehicle, may be selected in the image. FIG. 14 shows an example of selecting a vehicle 1412a by using the object classification interface 1412.

The video summary search setting interface 1410 may support a color classification interface 1414 for detecting a certain color. The color classification interface 1414 may support various color charts. The user or administrator may select colors 1414a and 1414b on the color charts supported by the color classification interface 1414.

The video summary search setting interface 1410 may support a certain area classification interface 1416 for setting a virtual line, an interest area, and an exclusion area.

By using the certain area classification interface 1416, a virtual line 1416a may be indicated on the video summary, or an interest area 1430 or an exclusion area 1440 may be set. The interest area 1430 or the exclusion area 1440 may be portions of the image.

In this case, a video summary satisfying a condition selected by the user is displayed on a video summary search screen 1420. Video summaries satisfying conditions regarding a date and a time 1442, 1446, and 1448, the colors 1414a and 1414b, the object 1412a, and the virtual line 1416a, all of which are selected by the user, may be displayed.

In an exemplary embodiment, the user may set a desired condition by using the video summary search setting interface 1410, but may also change a setting through a method of touching the video summary search screen 1420, etc. by using an interface displayed on the video summary search screen 1420.

The above exemplary embodiments can also be implemented through computer readable code/instructions in/on a medium, e.g., a computer readable medium, to control at least one processing element to implement any of the above described embodiments. The medium can correspond to any medium/media permitting the storage and/or transmission of the computer readable code.

The computer readable code can be recorded/transferred on a medium in a variety of ways, with examples of the medium including a recording medium, such as a magnetic storage medium (e.g., read-only memory (ROM), floppy disk, hard disk, etc.) and an optical recording medium (e.g., compact disc (CD) or DVD), and a transmission medium such as an Internet transmission medium. Thus, the medium may be a measurable structure including or carrying a signal or information, such as a device carrying bitstreams according to one or more exemplary embodiments. The medium may also be a distributed network so that the computer readable code is stored/transferred and executed in a distributed fashion. Furthermore, the processing element could be a processor or a computer processor, and processing elements may be distributed and/or included in a single device.

At least one of the components, elements or units represented by a block as illustrated in FIGS. 1, 2 and 10 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

It should be understood that the exemplary embodiments described therein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope of the inventive concept as defined by the following claims.

What is claimed is:

1. An imaging apparatus comprising:
   a video reproducer configured to reproduce a video and a heatmap of the video on a display;
   a sub-heatmap area setter configured to set a plurality of sub-heatmap areas on the heatmap; and a video summarizer configured to provide at least one video summary of the video to at least one summary area selected from among the plurality of sub-heatmap areas, respectively, wherein the video reproducer is configured to provide a three-dimensional (3D) area on the plurality of sub-heatmap areas in which a portion of the video and heatmap data of the portion of the video are displayed on different facets of the 3D area.

2. The imaging apparatus of claim 1, wherein the video reproducer is further configured to reproduce the at least one portion of the video on at least one sub-heatmap area, among the plurality of sub-heatmap areas, which corresponds to the at least one selected interest area, respectively, and provide heatmap data on at least one sub-heatmap area, among the plurality of sub-heatmap areas, which does not correspond to the at least one selected interest area.

3. The imaging apparatus of claim 1, wherein the heatmap comprises statistical data, and the statistical data comprises at least one of object classification data, color classification data, movement detection data, object data, and event data.

4. The imaging apparatus of claim 1, wherein the video reproducer is further configured to provide heatmap data along with the at least one video summary to the at least one selected summary area.

5. The imaging apparatus of claim 1, wherein the video summarizer is configured to provide a video summary on a sub-heatmap area, among the plurality of sub-heatmap areas, which corresponds to the at least one selected summary area, and wherein the video reproducer is further configured to provide heatmap data on a sub-heatmap area, among the plurality of sub-heatmap areas, which does not correspond to the at least one selected summary area.

6. The imaging apparatus of claim 1, wherein, in response to selection of multiple summary areas among the at least one summary area, the imaging apparatus is configured to provide an interface for selecting a same or different video analysis options for each of the selected summary areas.

7. The imaging apparatus of claim 1, wherein the video reproducer is configured to provide heatmap data along with the at least one video summary to the at least one selected summary area such that the heatmap data and the at least one video summary overlap with each other.

8. The imaging apparatus of claim 1, wherein the video reproducer configured to reproduce a video and a heatmap of the video on a display in a selective manner between overlapping the video and the heatmap with each other and displaying the video and the heatmap on different areas on the display, respectively.

9. The imaging apparatus of claim 1, wherein the video and the heatmap reproduced by the video reproducer correspond to a time section selected by a user.

10. The imaging apparatus of claim 1, wherein the video reproducer is configured to provide heatmap data on the heatmap and reproduce the video on an area different from the heatmap on the display.

11. A method of providing imaging information to an imaging apparatus, the method comprising:
reproducing a video and a heatmap of the video on a display;
setting a plurality of sub-heat map areas on the heatmap;
reproducing at least one portion of the video on at least one interest area selected from among the plurality of sub-heatmap areas, respectively; and
providing a three-dimensional (3D) area on the plurality of sub-heatmap areas in which a portion of the video and heatmap data of the portion of the video are displayed on different facets of the 3D area.

12. The method of claim 11, further comprising:
reproducing the at least one portion of the video on at least one sub-heatmap area, among the plurality of sub-heatmap areas, which corresponds to the at least one selected interest area, respectively; and
providing heatmap data on at least one sub-heatmap area, among the plurality of sub-heatmap areas, which does not correspond to the at least one selected interest area.

13. An imaging apparatus comprising:
a video reproducer configured to reproduce a video and a heatmap of the video on a display; and
a sub-heatmap area setter configured to set at least one sub-heatmap area on the heatmap,
wherein the sub-heatmap area setter provides an interface for setting the at least one sub-heatmap area, and
wherein the video reproducer is configured to provide a three-dimensional (3D) area on the sub-heatmap area in which a portion of the video and heatmap data of the portion of the video are displayed on different facets of the 3D area.

14. The imaging apparatus of claim 13, the interface is provided in a live view.

15. The imaging apparatus of claim 13, wherein the heatmap comprises statistical data, and the statistical data comprises at least one of object classification data, color classification data, movement detection data, object data, appearance frequency data of person in the video and event data.

16. The imaging apparatus of claim 13, wherein the heatmap is displayed by overlapping at least one layer on the video.

17. The imaging apparatus of claim 13, the interface is further provided to set a name of each sub-heatmap.

18. The imaging apparatus of claim 13, further comprising a video summarizer configured to provide at least one video summary of the video to at least one summary area selected from among the at least one sub-heatmap area, respectively.

* * * * *